Patented May 29, 1934

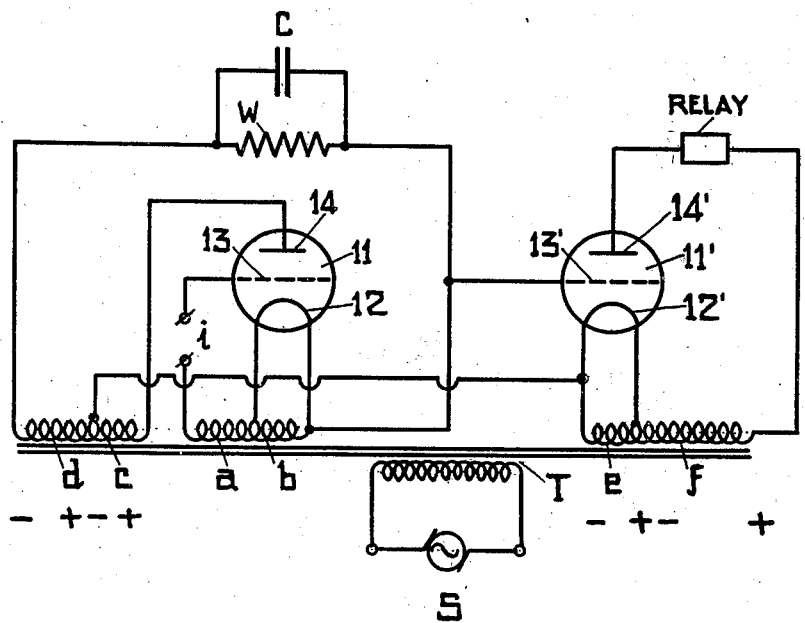

1,960,689

UNITED STATES PATENT OFFICE 1,960,689

CONTINUOUS CURRENT AMPLIFIER

Erich Asch, Berlin-Sudende, Germany, assignor to Radio Patents Corporation, New York, N. Y., a corporation of New York Application April 28, 1930, Serial No. 448,076
In Germany April 16, 1929

6 Claims. (Cl. 179—171)

My invention relates to a method of and means for operating electrical systems comprising discharge devices, and more particularly to direct coupled systems for translating or amplifying electrical variations.

One object of my invention is to provide a direct coupled amplifier which may be operated directly from a source of alternating current without the necessity of rectifying the alternate current, as in the case of similar systems known in the prior art.

Further objects of the invention consist in simplifying the design and operation of direct coupled amplifiers, in increasing their operating reliability and decreasing the current consumption.

The novel features of the invention will be described with reference to the accompanying drawing illustrating a circuit diagram for an amplifier embodying the invention.

In the arrangement illustrated, both operating and biasing potentials for the amplifying tubes are supplied from the secondary windings of an alternating current transformer T fed by a source S of alternating current, such as a home lighting circuit. I have shown two amplifying tubes 11 and 11' each comprising cathodes 12 and 12', anodes 14 and 14', and grid electrodes 13 and 13', respectively. The anode voltage for tube 11 is supplied by the secondary D. C. of the transformer T and the anode voltage for the tube 11' is supplied by the secondary f of the same transformer. The cathodes 12 and 12' are heated by means of the heating windings b and e, respectively, of the supply transformer T. I have shown a further secondary winding a to supply the proper grid biasing potential for the tube 11, the input signal current to be applied to the terminals i. The anode circuit of the second tube 11' includes a translating device, such as a relay as indicated in the diagram. The anode circuit of tube 11 includes an impedance, such as a high ohmic resistance w. Both tubes are directly coupled with each other by means of a conductive connection from the cathode 12 of the first tube to the grid 13' of the second tube and a further connection from a suitable point in the anode circuit of the first tube, such as from the point connecting the two portions d and c of the anode current supply winding, to the cathode 12' of the second tube in such a manner that a suitable biasing potential difference is secured between the grid and cathode of the second tube 11'.

Such a direct coupled amplifier may be used for amplifying slow input current variations such as varying direct currents and the like, as well as for amplifying the rectified component of alternating current voltages of all frequencies such as in particular high frequencies which differ by a sufficient amount from the frequency of the supply alternating current. The amplifier then always operates during the period when the anodes of the individual stages of the amplifier are at positive potential. The translating device or relay in the output of the second tube responsive to direct current, is controlled by the average value of the current during the positive half cycles.

In an amplifier according to the invention, as shown, the load on the anodes of the tubes is small when no input energy is applied to the amplifier and it increases proportionately with the input energy applied whereby the life of the tubes is substantially increased and the translating device, such as relay shown in the output circuit of the last tube is in its de-energized condition when no input signals are applied to the amplifier. If, for instance, high frequency currents are applied to the amplifier, the direct current voltage at the resistance w is increased and the grid of the second tube becomes more positive in such a manner that when input energy is applied to the amplifier the anode current increases, resulting in the energization of the translating device. It is understood that the transformer windings have to have a proper relative winding sense as indicated by the plus and minus signs corresponding to the working phase of the alternating supply current. It is seen that the phases of the anodes of both tubes are such as to become positive during the same half cycle.

According to a further feature of the invention, it is advisable in all cases to secure the correct phases of the transformer windings by connecting a large capacity C in parallel to the ohmic resistance w. This acts to accumulate the direct current energy during the negative half cycle of the current; that is, the non-useful period of the alternating supply current.

It is understood that the invention as described is subject to modifications and variations coming within its broadest scope as expressed in the appended claims.

What I claim is:

1. In an electrical system comprising a first discharge device; a second discharge device, each having a cathode, anode and a control electrode; a source of alternating current and a transformer supplied from said source; a plurality of secondary windings of said transformer connected with said devices for producing respective operating and biasing potentials; a direct conductive coupling connection from the cathode of said first device to the control electrode of said second device; and a further connection from a point in the anode circuit of said first tube to the cathode of said second device to secure proper biasing potential at the control electrode of said second tube, the current supplied by said source having a frequency substantially higher than the frequency of the input current variations applied to said system.

2. In an electrical system comprising a first discharge device; a second discharge device, each having input and output electrodes; a source of alternating current and a transformer supplied from said source and having a plurality of secondary windings for producing respective operating and biasing potentials for said devices; a direct conductive coupling connection from a point in the output circuit of said first device to the control electrode of said second device; a further connection from a different point in the output circuit of said first device to a point in the output circuit of said second device to secure proper operating potential at the control electrode of said second device, the frequency of the current supplied by said source being substantially higher than the frequency of the current variations to be translated by said system.

3. In an electrical system comprising a first discharge device; a second discharge device, each having a cathode, an anode and a control electrode; a plurality of sources of alternating current for supplying operating and biasing potentials for said devices; direct conductive coupling connections from points in the anode circuit of said first device to the control electrode of said second device and to a point in the anode circuit of said second device, respectively, to secure proper biasing potential at the control electrode of said second device, the frequency of said alternating currents being substantially higher than the frequency of the input current variations to be repeated by said system.

4. In an electrical system comprising a first discharge device; a second discharge device, each having a cathode, anode and a grid electrode; a source of alternating anode current for said first device; another source of alternating anode current for said second device; a high resistance inserted in the anode circuit of said first device; and direct coupling connections from points in the anode circuit of said first device to the grid and cathode of said second device, respectively, for securing proper grid biasing potential of said second device, the frequency of said alternating currents being substantially higher than the frequency of the current variations to be applied to and translated by said system.

5. In an electrical system comprising a first discharge device; a second discharge device, each having a cathode, anode and a grid electrode; sources of alternating anode current supply for each of said devices; a high resistance in the anode circuit of said first device and direct coupling connections from the ends of said resistance to the cathode and grid, respectively, of said second device and a capacity in parallel to said high resistance, the frequency of said alternating currents being substantially higher than the frequency of the current variations to be applied to and translated by said system.

6. In an electrical system comprising a first discharge device; a second discharge device, each having a cathode, anode and a grid electrode; sources of alternating anode current supply for said devices; a high ohmic resistance in the anode circuit of said first device; a direct conductive coupling connection from the cathode of said first device to the grid of said second device; a further connection from a point in the anode circuit of said first device to the cathode of said second device to secure proper grid biasing potential for said second device; and a condenser connected in parallel to said high ohmic resistance.

ERICH ASCH.